United States Patent Office 3,403,973
Patented Oct. 1, 1968

3,403,973
WATER-SOLUBLE POLYPHOSPHORIC ACID AND CALCIUM SALTS DERIVED THEREFROM
Donald E. Lee, Atlanta, Ga., and Ernest Csendes, Palisades, Calif., assignors, by mesne assignments, to Armour Agricultural Chemical Company, a corporation of Delaware
No Drawing. Filed Aug. 4, 1964, Ser. No. 387,499
6 Claims. (Cl. 23—109)

ABSTRACT OF THE DISCLOSURE

Wet process superphosphoric acid having a $P_2O_5$ content of about 64–72 weight percent is heated at about 600–800° C. for 1 to 120 minutes, preferably about 30 minutes, until a solid product having a $P_2O_5$ content of at least 80 weight percent is obtained and until at least 80 percent of its $P_2O_5$ content is water-soluble. Alternatively, the starting acid may be reacted with calcium carbonate to bring the $CaO/P_2O_5$ ratio to about 0.20–1.00 and the resulting calcium polyphosphate heated to about 600–800° C. until a solid product is obtained having at least 80 weight percent $P_2O_5$ and at least 80 percent of the $P_2O_5$ water-soluble.

---

This invention relates to water-soluble polyphosphoric acid and calcium salts derived therefrom, and more particularly to the selective heat treatment of wet process superphosphoric acid to obtain a high analysis $P_2O_5$ solid having a large proportion of its $P_2O_5$ content in water-soluble form.

Heretofore efforts to concentrate wet process phosphoric acid have involved the removal of so much water of constitution that the solid product was essentially water-insoluble and could be hydrated only with difficulty. If it were possible to treat wet process phosphoric acid, and particularly high analysis, wet process superphosphoric acid or calcium salts thereof in such a manner as to convert a large proportion, such as, for example, 80 percent of its $P_2O_5$ content, to water-soluble form, a substantial advance in the art would be achieved.

An object of the invention is to prepare a solid polyphosphoric acid having a large proportion of its $P_2O_5$ content in water-soluble form. A further object is to provide a process for the preparation of such acid in which the conversion of the $P_2O_5$ content to water-soluble form is accomplished in a minimum of time. A still further object is to provide a water-soluble polyphosphoric acid and calcium salts derived therefrom. Other specific objects and advantages will appear as the specification proceeds.

In one embodiment of our invention, we heat wet process superphosphoric acid at a relatively high temperature in the neighborhood of 700° C. for a relatively short time, keeping the temperature well below 1000° C. We prefer to use a very high temperature in the range of 600° to 800° C., and to rapidly heat the product in this range for a period of minutes which may be from 1 to 120 minutes, with best results being achieved in the range of 1 to 30 minutes.

While conventional wet process phosphoric acid may be used, we prefer to employ as a starting material superphosphoric acid having a $P_2O_5$ content, by analysis, of about 64 to 72 percent (70 to 80 weight percent when calculated on an impurity-free basis).

At temperatures approaching 1000° C., we find that the $P_2O_5$ content becomes largely insoluble. However, in the range of 600° to 700° C., we find that a great proportion of the $P_2O_5$ is converted to the water-soluble form while the product remains a solid. Excellent results have been obtained when the superphosphoric acid was rapidly heated for a very short time at a temperature range in the neighborhood of 700° C.

We have also discovered that by using a low proportion of $CaO/P_2O_5$, we can obtain a solid, calcium-containing $P_2O_5$ product analyzing greater than 80 percent, with over 80 percent of the $P_2O_5$ in a water-soluble form. In this process also, we prefer to employ rapid heating for a very short time in a temperature range in the neighborhood of 700° C.

Specific examples illustrative of our process and product may be set out as follows:

Example I

Superphosphoric acid having a $P_2O_5$ content of about 64 was placed in a muffle furnace maintained at 70° C. After the indicated residence time, the sample was removed, cooled, and analyzed. The results were as follows:

| Time (min.) | Percent $P_2O_5$ | | | Percent water soluble of total | Percent fluorine |
|---|---|---|---|---|---|
| | Total | Insoluble | Water soluble | | |
| 0 | 70.10 | 0.75 | 68.5 | 97.7 | 0.80 |
| 30 | 84.9 | 13.3 | 72.6 | 85.5 | 0.05 |
| 60 | 85.1 | 17.0 | 67.0 | 78.7 | 0.04 |
| 120 | 74.4 | 23.5 | 41.2 | 55.4 | 0.04 |

Example II

The process was carried out as described in Example I except that the temperature was raised to 1000° C., the following results being obtained:

| Time (min.) | Percent $P_2O_5$ | | | Percent water soluble of total | Percent fluorine |
|---|---|---|---|---|---|
| | Total | Insoluble | Water soluble | | |
| 30 | 79.8 | 69.3 | 0.73 | 0.9 | 0.04 |
| 60 | 80.8 | 70.4 | 0.80 | 1.0 | 0.05 |
| 120 | 79.6 | 70.7 | 0.85 | 1.1 | 0.04 |

The above data in Examples I and II demonstarte that a solid $P_2O_5$ product analyzing more than 80 percent $P_2O_5$, over 80 percent of which is water soluble, can be obtained by relatively short heating time at 700° C., whereas the same treatment at 1000° C. gives a water-insoluble product.

Example III

Further tests indicate that there is $P_2O_5$ volatilization at the higher temperature but very little at 700° C. The process carried on as described in Example II at the temperature of 1000° C. gave the following results:

| Time (min.) | Percent $P_2O_5$ | | | Percent water soluble of total | Percent fluorine |
|---|---|---|---|---|---|
| | Total | Insoluble | Water soluble | | |
| 30 | 76.3 | 47.1 | 0.80 | 1.05 | 0.01 |
| 60 | 70.1 | 50.5 | 0.85 | 1.21 | 0.16 |
| 120 | 69.9 | 57.4 | 0.40 | 0.57 | 0.05 |

Example IV

Wet process superphosphoric acid was reacted with calcium carbonate in a $CaO/P_2O_5$ ratio of 0.20 and was placed in a muffle furnace maintained at temperatures shown below and with the following results:

| Temp. | Time | Percent $P_2O_5$ | | | Percent water soluble of total | Percent fluorine |
|---|---|---|---|---|---|---|
| | | Total | Insol. | Water soluble | | |
| Room | 0 | 64.2 | 0.35 | 64.0 | 99.7 | 0.4 |
| 450 | 30 | 74.2 | 7.8 | 64.7 | 87.3 | 0.17 |
| | 60 | 77.6 | 13.3 | 58.0 | 74.7 | 0.07 |
| | 120 | 78.9 | 14.0 | 64.0 | 81.0 | 0.07 |
| 700 | 30 | 79.5 | 13.5 | 66.3 | 83.4 | 0.04 |
| | 60 | 81.5 | 13.2 | 60.9 | 74.6 | 0.04 |
| | 120 | 82.1 | 13.0 | 9.70 | 11.8 | 0.03 |
| 1,000 | 30 | 82.4 | 58.9 | 1.75 | 2.1 | 0.02 |
| | 60 | 82.6 | 56.5 | 1.05 | 1.3 | 0.02 |
| | 120 | 82.5 | 59.4 | 0.90 | 1.1 | 0.08 |

By maintaining a $CaO/P_2O_5$ ratio substantially below 1.0 and preferably about 0.20, we produce a solid, calcium-containing $P_2O_5$ product having more than 80 weight percent of $P_2O_5$ and more than 80 percent of the $P_2O_5$ in water-soluble form.

In all of the foregoing examples, we have found that the wet process superphosphoric acid responded to treatment in which the heating was in the range of about 700° C. and where the heating was conducted for a very short time, preferably between 1 and 30 minutes.

While in the foregoing specification, we have set forth specific embodiments of the invention in considerable detail for the purpose of illustrating the invention, it will be understood that such detail may be varied widely by those skilled in the art without departing from the spirit and scope of our invention.

We claim:

1. In a process for preparing water-soluble superphosphoric acid, the step of heating wet process superphosphoric acid having a $P_2O_5$ content of about 64–72 weight percent at a temperature of about 600° to 800° C. for a period of 1 to 12 minutes until at least 80 percent of the $P_2O_5$ content thereof is water soluble.

2. The process of claim 1 in which the heating is about 1 to 30 minutes.

3. In a process for preparing water-soluble superphosphoric acid, the step of heating wet process superphosphoric acid having a $P_2O_5$ content of about 64–72 weight percent at a temperature of about 700° C. for a period of about 1 to 30 minutes until the product is solid and has at least 80 percent of the $P_2O_5$ content thereof in water-soluble form.

4. The process of claim 3 in which the heating is continued until the product has a $P_2O_5$ content of at least 80 weight percent.

5. In a process for preparing a calcium salt of water-soluble superphosphoric acid, the steps of reacting superphosphoric acid having a $P_2O_5$ content of about 64–72 weight percent with calcium carbonate to bring the $CaO/P_2O_5$ ratio to about 0.20–1.00, and then heating the resulting calcium polyphosphate at a temperature of about 600° to 800° C. until the product is a solid having a $P_2O_5$ content of at least 80 weight percent $P_2O_5$ and until at least 80 percent of the $P_2O_5$ content thereof is water soluble.

6. The process of claim 5 in which the temperature is maintained at about 700° C. for about 1 to 30 minutes.

References Cited

UNITED STATES PATENTS

| | | | |
|---|---|---|---|
| 1,688,822 | 10/1928 | Maxwell et al. | 23—165 |
| 2,889,217 | 6/1959 | Le Baron | 71—47 |
| 3,207,580 | 9/1965 | Cosway et al. | 23—165 |
| 3,316,061 | 4/1967 | Csendes et al. | 23—165 |

OTHER REFERENCES

Van Wazer: Phosphorus and Its Compounds, vol. II, Technology, Biological Functions, and Applications, Interscience, 1961, pp. 1077, 1215–1217.

OSCAR R. VERTIZ, *Primary Examiner.*

L. A. MARSH, *Assistant Examiner.*

U.S. DEPARTMENT OF COMMERCE
PATENT OFFICE
Washington, D.C. 20231

UNITED STATES PATENT OFFICE
CERTIFICATE OF CORRECTION

Patent No. 3,403,973                              October 1, 1968

Donald E. Lee et al.

It is certified that error appears in the above identified patent and that said Letters Patent are hereby corrected as shown below:

Column 2, line 15, "70° C." should read -- 700° C. --.

Signed and sealed this 24th day of February 1970.

(SEAL)
Attest:

Edward M. Fletcher, Jr.                          WILLIAM E. SCHUYLER, JR.
Attesting Officer                                        Commissioner of Patents